US009952499B2

(12) United States Patent
Jeong et al.

(10) Patent No.: US 9,952,499 B2
(45) Date of Patent: Apr. 24, 2018

(54) METHOD OF FABRICATING A MASK USING COMMON BIAS VALUES IN OPTICAL PROXIMITY CORRECTION

(71) Applicant: SAMSUNG ELECTRONICS CO., LTD., Suwon-si, Gyeonggi-Do (KR)

(72) Inventors: Moon-Gyu Jeong, Gwangmyeong-si (KR); So-Rang Jeon, Incheon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 200 days.

(21) Appl. No.: 15/090,154

(22) Filed: Apr. 4, 2016

(65) Prior Publication Data
US 2016/0327856 A1   Nov. 10, 2016

(30) Foreign Application Priority Data
May 6, 2015   (KR) .......................... 10-2015-0063194

(51) Int. Cl.
| | | |
|---|---|---|
| G06F 17/50 | (2006.01) | |
| G03F 1/00 | (2012.01) | |
| G03F 1/36 | (2012.01) | |
| G03F 1/70 | (2012.01) | |
| G03F 7/20 | (2006.01) | |

(52) U.S. Cl.
CPC .................. *G03F 1/36* (2013.01); *G03F 1/70* (2013.01); *G06F 17/5068* (2013.01); *G06F 17/5081* (2013.01); *G03F 7/70441* (2013.01); *G06F 2217/12* (2013.01)

(58) Field of Classification Search
None
See application file for complete search history.

(56) References Cited

U.S. PATENT DOCUMENTS

| | | | |
|---|---|---|---|
| 6,753,115 B2 * | 6/2004 | Zhang | ...................... G03F 1/36 430/5 |
| 6,785,874 B2 | 8/2004 | Tsukuda | |
| 7,000,208 B2 | 2/2006 | Zhang | |
| 7,093,228 B2 * | 8/2006 | Andreev | ................... G03F 1/36 716/53 |

(Continued)

FOREIGN PATENT DOCUMENTS

| | | |
|---|---|---|
| KR | 1020020034310 | 5/2002 |
| KR | 1020080110530 | 12/2008 |

*Primary Examiner* — Leigh Garbowski
(74) *Attorney, Agent, or Firm* — F. Chau & Associates, LLC

(57) ABSTRACT

A mask fabricating method includes dividing an outline of a design layout into segments, setting comparison areas with respect to an evaluation point corresponding to each of the segments, for each segment, calculating an overlapping area between the design layout and each of the comparison areas, classifying the segments into groups based on the calculated overlapping areas, wherein segments having a characteristic of the same overlapping area are included in a first group, calculating bias values for each of the segments, obtaining a representative bias value for each group, for each group, assigning the representative bias value obtained for that group to each of its segments, updating the design layout based on the segments with their assigned representative bias values, and fabricating a mask based on the updated design layout.

20 Claims, 14 Drawing Sheets

(56) References Cited

U.S. PATENT DOCUMENTS

| | | | | |
|---|---|---|---|---|
| 7,302,673 B2* | 11/2007 | Habitz | ............. | G03F 1/36 |
| | | | | 716/52 |
| 7,512,927 B2* | 3/2009 | Gallatin | ............. | G03F 1/36 |
| | | | | 430/30 |
| 7,523,027 B2 | 4/2009 | Chang et al. | | |
| 7,681,173 B2 | 3/2010 | Kosa et al. | | |
| 7,707,538 B2 | 4/2010 | Wong et al. | | |
| 7,945,872 B2 | 5/2011 | Wang | | |
| 7,979,811 B2* | 7/2011 | Wu | ............. | G06F 17/5068 |
| | | | | 716/50 |
| 8,161,421 B2 | 4/2012 | Viswanathan et al. | | |
| 8,281,264 B2* | 10/2012 | Zhang | ............. | G03F 1/36 |
| | | | | 716/132 |
| 8,281,270 B2 | 10/2012 | Drennan et al. | | |
| 8,291,352 B2 | 10/2012 | Wong et al. | | |
| 8,446,565 B2 | 5/2013 | Hsuan et al. | | |
| 8,832,610 B2* | 9/2014 | Ye | ............. | G03F 1/144 |
| | | | | 716/50 |
| 8,938,699 B2* | 1/2015 | Wong | ............. | G03F 1/144 |
| | | | | 716/55 |
| 9,619,607 B2* | 4/2017 | Tao | ............. | G06F 17/5081 |
| 2010/0062549 A1* | 3/2010 | Maeda | ............. | G03F 1/36 |
| | | | | 438/14 |

\* cited by examiner

|       | CA_1 | CA_2 | ... | CA_N |
|-------|------|------|-----|------|
| SEG_1 | 0.5  | 1.0  | ... | 4.0  |
| SEG_2 | 0.5  | 1.0  | ... | 4.0  |
| ⋮     | ⋮    | ⋮    |     | ⋮    |
| SEG_K | 2.5  | 1.0  | ... | 1.5  |

| Group 1 | SEG_1, SEG_2, ..., SEG_X |
|---------|--------------------------|
| Group 2 | SEG_3                    |
| ⋮       | ⋮                        |
| Group P | SEG_Y, SEG_K             |

METHOD OF FABRICATING A MASK USING COMMON BIAS VALUES IN OPTICAL PROXIMITY CORRECTION

CROSS-REFERENCE TO RELATED APPLICATION

This U.S. non-provisional patent application claims priority under 35 U.S.C. § 119 to Korean Patent Application No. 10-2015-0063194 filed on May 6, 2015, in the Korean Intellectual Property Office, the disclosure of which is incorporated by reference herein in its entirety.

TECHNICAL FIELD

The present inventive concept relates to semiconductor processes and, more particularly, to a method of fabricating a mask including image patterns used to print a layout on a wafer.

DISCUSSION OF THE RELATED ART

The functions of an electronic device depend on chips or circuits included therein. Chips or circuits of an electronic device may include semiconductor elements fabricated by semiconductor processes. As semiconductor process technologies advance, sizes of an electronic device and the chips or circuits included therein have decreased. Moreover, functions performed by the electronic device and the chips or circuits included therein have been diversified.

A semiconductor process used to obtain a chip or circuit with semiconductor elements includes a photolithography process. The photolithography process is used to print a layout on a semiconductor wafer (e.g., a silicon or gallium arsenide (GaAs) wafer). The layout on the wafer includes circuit patterns. These circuit patterns are designed to permit various functions to be performed.

In the photolithography process, a mask is used to print a layout on a wafer. The mask typically includes a transparent area and an opaque area. The transparent area is formed by etching a metal layer on the mask. The transparent area passes light and the opaque area does not pass light. The transparent area and the opaque area form image patterns that are used to print the layout on the wafer when light emitted from a light source is projected to the wafer via the image patterns of the mask. A layout including circuit patterns is printed on the wafer.

However, a distance between image patterns of a mask may be very small and width of a transparent area may be very narrow. Due to this close proximity, interference and diffraction of light may occur, and thus, a layout that is different from a desired layout may be printed on a wafer.

A resolution enhancement technology may be used to prevent distortion of a layout. Optical proximity correction is an example of one such resolution enhancement technology. In optical proximity correction, the level of the distortion such as interference and diffraction of light may be estimated in advance. Moreover, the image patterns to be formed on a mask may be biased in advance based on a result of the estimation. Thus, a desired layout may be printed on a wafer.

SUMMARY

According to an exemplary embodiment of the inventive concept, a mask fabricating method includes dividing an outline of a design layout into a plurality of segments, setting one or more comparison areas, each of the comparison areas being formed with respect to an evaluation point corresponding to each of the segments, the comparison areas being different from one another, for each of the segments, calculating an overlapping area between the design layout and each of the comparison areas, classifying the segments into a plurality of groups based on the calculated overlapping areas, wherein segments having a same overlapping area are included in a same group, calculating a bias value for each of the segments, obtaining a representative bias value for each of the groups, for each of the groups, assigning the representative bias value obtained for that group to each of its segments, updating the design layout based on the segments with their assigned representative bias values, and fabricating a mask based on the updated design layout.

In an exemplary embodiment of the inventive concept, for each of the segments, the evaluation point corresponds to a middle point of each of the segments.

In an exemplary embodiment of the inventive concept, a center of the comparison areas set at each of the segments corresponds to the middle point of its respective segment.

In an exemplary embodiment of the inventive concept, the representative bias value of a respective group is an average of the bias values of the one or more segments included in that group.

In an exemplary embodiment of the inventive concept, the mask fabricating method further includes determining whether an error between an actual layout to be obtained based on the updated design layout and a target layout is within an allowable level, and when the error is not within the allowable level, re-performing steps of calculating the bias value, obtaining the representative bias value, assigning the representative bias value, and updating the design layout on the updated design layout.

In an exemplary embodiment of the inventive concept, when the error is within the allowable level, the mask is fabricated based on the updated design layout.

According to an exemplary embodiment of the inventive concept, a mask fabricating method includes calculating bias values for some or all of a plurality of segments, the segments being obtained by dividing an outline of a design layout, updating the design layout by assigning the bias values to the segments, and fabricating a mask based on the updated design layout. Updating the design layout includes assigning a same bias value to one or more segments having a same surrounding condition, the surrounding condition of each segment being based on overlapping areas between the design layout and one or more comparison areas, each of the one or more comparison areas being formed with respect to an evaluation point corresponding to each of the segments.

In an exemplary embodiment of the inventive concept, each of the comparison areas is disposed around a middle point of each corresponding segment. The comparison areas do not overlap with each other. A comparison area formed at an evaluation point of a first segment has a same shape as a comparison area formed at an evaluation point of a second segment.

In an exemplary embodiment of the inventive concept, calculating the bias values includes calculating a bias value for each of the segments. Assigning the same bias value includes classifying the segments into a plurality of groups based on the overlapping areas, wherein one or more segments having the same surrounding condition are included in a same group, obtaining a representative bias value for each of the groups, and for each of the groups, assigning the representative bias value obtained for that group to each of its segments.

In an exemplary embodiment of the inventive concept, calculating the bias values includes classifying the segments into a plurality of groups based on the overlapping areas, wherein one or more segments having the same surrounding condition are included in a same group, for each of the groups, selecting a representative segment from among one or more segments included in each of the groups, and calculating a bias value for each of the representative segments. Assigning the same bias value includes assigning the bias value of a respective representative segment to each segment included in a same group as the representative segment.

In an exemplary embodiment of the inventive concept, the comparison areas comprise first to $N^{th}$ comparison areas, the first comparison area having a square shape, and each of the second to $N^{th}$ comparison areas have a square ring shape. The square ring shape has a first ring width along a first direction, a second ring width along a second direction, a first distance from its corresponding evaluation point to an external outline along the first direction, and a second distance from its corresponding evaluation point to the external outline along the second direction. The N is an integer greater than or equal to 2.

In an exemplary embodiment of the inventive concept, for each of the second to $N^{th}$ comparison areas, their first and second ring widths are determined or adjusted based on a resolution of a process.

In an exemplary embodiment of the inventive concept, the first distance is w times the first ring width and the second distance is w times the second ring width, for each of the second to $N^{th}$ comparison areas. The w is an integer between 2 and N.

In an exemplary embodiment of the inventive concept, the square ring shape is based on a ratio of the first distance to the second distance.

In an exemplary embodiment of the inventive concept, a number of the comparison areas is determined or adjusted based on a distance where a bias value to be assigned to each segment is affected on the design layout.

According to an exemplary embodiment of the inventive concept, a mask fabricating method includes receiving a first circuit pattern and a second circuit pattern, dividing an outline of the first circuit pattern into a first segment and a second segment, dividing an outline of the second circuit pattern into a third segment and a fourth segment, assigning a first reference point to the first segment, a second reference point to the second segment, a third reference point to the third segment, and a fourth reference point to the fourth segment, disposing a first comparison area on the first reference point, a second comparison area on the second reference point, a third comparison area on the third reference point and a fourth comparison area on the fourth reference point, wherein the first to fourth comparison areas have a same shape, determining a first overlapping area between the first comparison area and the first and second circuit patterns, a second overlapping area between the second comparison area and the first and second circuit patterns, a third overlapping area between the third comparison area and the first and second circuit patterns, and a fourth overlapping area between the fourth comparison area and the first and second circuit patterns, assigning the first and second segments into a first group when the first and second overlapping areas are equal to each other, assigning the third segment into a second group when the third overlapping area is different from the first and second overlapping areas, determining a first bias value for the first segment, a second bias value for the second segment, a third bias value for the third segment and a fourth bias value for the fourth segment, assigning a first representative bias value to each of the first and second segments, wherein the first representative bias value is obtained based on the first bias value and/or the second bias value, changing the outline of the first circuit pattern based on the first representative bias value, and fabricating a mask based on the changed outline.

In an exemplary embodiment of the inventive concept, when the fourth overlapping area is different from the first, second and third overlapping areas, the fourth segment is assigned into a third group.

In an exemplary embodiment of the inventive concept, the first representative bias value is equal to the first bias value, the second bias value, or an average of the first and second bias values.

In an exemplary embodiment of the inventive concept, when the fourth overlapping area is equal to the first and second overlapping areas, the fourth segment is assigned into the first group, and the first representative value is obtained based on at least one of the first, second and/or fourth bias values and assigned to each of the first, second and fourth segments.

In an exemplary embodiment of the inventive concept, the first representative value is equal to the first bias value, the second bias value, the fourth bias value, or an average of the first, second and fourth bias values.

BRIEF DESCRIPTION OF THE DRAWINGS

The above and other features of the present inventive concept will become more apparent by describing in detail exemplary embodiments of the inventive concept with reference to the following figures, in which.

DETAILED DESCRIPTION OF THE EMBODIMENTS

Exemplary embodiments of the inventive concept will now be described more fully hereinafter with reference to the accompanying drawings. The present inventive concept may, however, be embodied in many different forms and should not be construed as limited to the exemplary embodiments set forth herein.

It will be understood that when an element or layer is referred to as being "on", "connected to" or "coupled to" another element or layer, it can be directly on, connected or coupled to the other element or layer or intervening elements or layers may be present. Like numerals may refer to like elements throughout the specification.

As used herein, the singular forms "a", "an" and "the" are intended to include the plural forms as well, unless the context clearly indicates otherwise.

Figure 1:
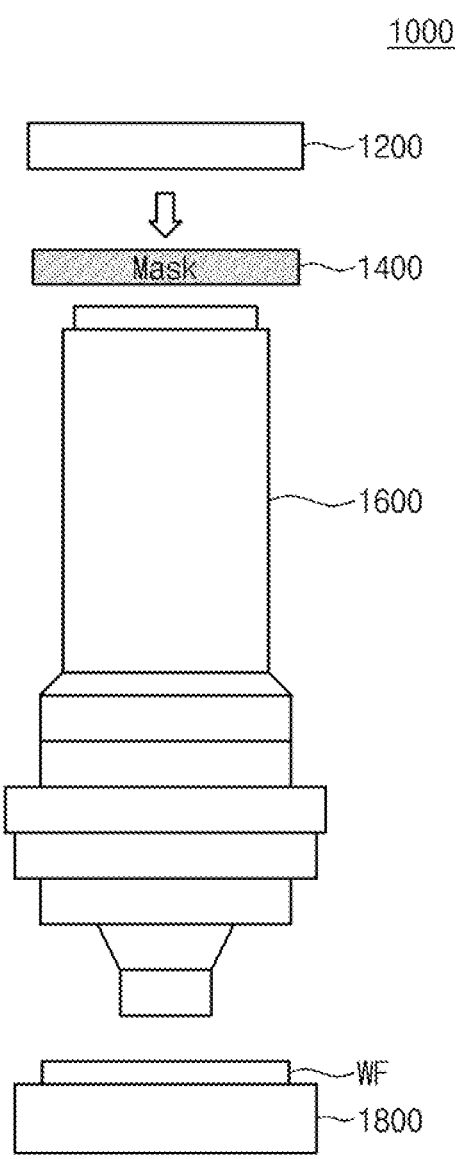
FIG. 1 is a diagram of a photolithography system used to fabricate a mask, according to an exemplary embodiment of the inventive concept.

FIG. 1 is a diagram of a photolithography system used to fabricate a mask, according to an exemplary embodiment of the inventive concept. A photolithography system 1000 may include a light source 1200, a mask 1400, a reduction projection device 1600, and a wafer stage 1800. However, the photolithography system 100 may include additional components. For example, the photolithography system 1000 may further include a sensor used to measure a height and a slope of a surface of a wafer WF.

The light source 1200 may emit light. The light emitted from the light source 1200 may be projected to the mask 1400. For example, the light source 1200 may include an ultraviolet (UV) light source (e.g., a krypton fluoride (KrF) light source having a wavelength of 234 nm, an argon fluoride (ArF) light source having a wavelength of 193 nm, or the like).

In addition, the light source 1200 may further include a collimator. The collimator may convert UV rays into parallel rays. The parallel rays may be provided to the mask 1400. For example, the collimator may include a dipole aperture or a quadruple aperture used to increase the depth of a focus of the UV rays.

The mask 1400 may include image patterns used to print a layout on the wafer WF. The image patterns may include a transparent area and an opaque area. The transparent area may be formed by etching a metal layer on the mask 1400. The transparent area may pass the light emitted from the light source 1200, while the opaque area may not pass the light. In other words, the opaque area blocks light emitted from the light source 1200.

The mask 1400 may be fabricated by means of a mask fabricating method according to exemplary embodiments of the present inventive concept. Exemplary embodiments of the present inventive concept will be described with reference to FIGS. 2 to 17.

The reduction projection device 1600 may receive the light passing through the transparent area of the mask 1400. The reduction projection device 1600 may match circuit patterns of a layout to be printed on the wafer WF with the image patterns of the mask 1400. The wafer stage 1800 may support the wafer WF.

The transparent area included in the image patterns of the mask 1400 may pass the light emitted from the light source 1200. The light passing the mask 1400 may be projected to the wafer WF via the reduction projection device 1600. Thus, a layout including circuit patterns corresponding to the image patterns of the mask 1400 may be printed on the wafer WF.

According to an exemplary embodiment of the present inventive concept, the same (or common) bias value is assigned to segments having the same surrounding condition. Thus, optical proximity correction in accordance with an exemplary embodiment of the present inventive concept may be performed with more efficiency and uniformity. As a result, the mask 1400 may be fabricated to include more precise image patterns.

Exemplary embodiments of the present inventive concept will now be described in detail with reference to FIGS. 2 to 17. More specifically, an exemplary embodiment of the inventive concept will be described where "model-based" optical proximity correction is performed. However, the described exemplary embodiment is not intended to limit the present inventive concept. It will be understood by those skilled in the art that the exemplary embodiments may be applied to other types of resolution enhancement technologies.

Figure 2:
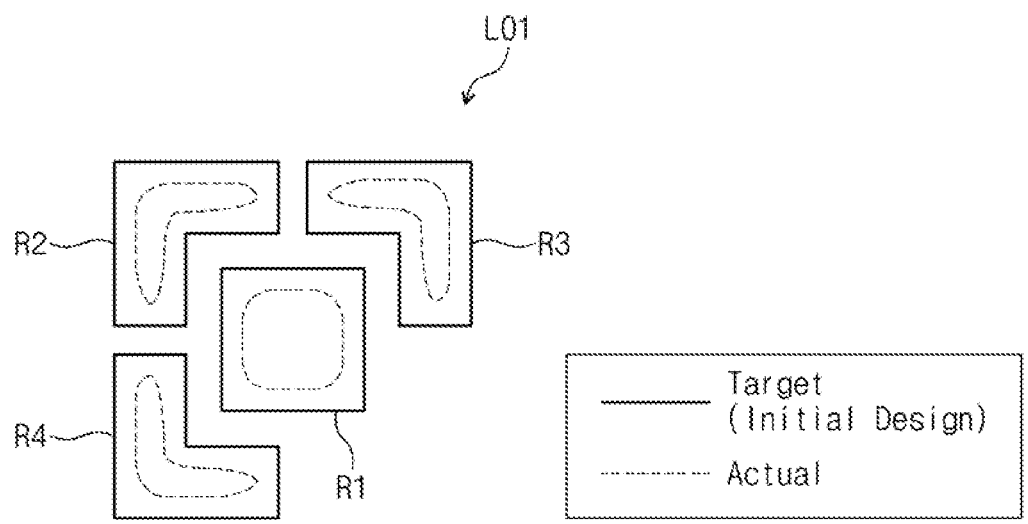
FIG. 2 is a diagram illustrating a layout on a wafer, according to an exemplary embodiment of the inventive concept.

FIG. 2 is a diagram illustrating a layout on a wafer, according to an exemplary embodiment of the inventive concept. For example, a layout LO1 shown in FIG. 2 may be printed on the wafer WF in FIG. 1. In FIG. 2, solid lines may represent a "target layout", that is desired to be printed on the wafer WF of FIG. 1, and dotted lines may represent an "actual layout", that is to be actually printed on the wafer WF of FIG. 1.

For example, the layout LO1 may include a first circuit pattern R1 to a fourth circuit pattern R4. However, a shape of the layout LO1 shown in FIG. 2 is just an example to help understanding of the present inventive concept, and is not intended to limit the present inventive concept.

For example, a designer of the layout LO1 may intend to print the layout LO1 of the first circuit pattern R1 to the fourth circuit pattern R4 along the solid lines of FIG. 2 on the wafer WF. The solid lines of FIG. 2 may represent a layout to be printed as a target layout. The target layout may be provided as an initial design layout.

However, distortion such as interference and diffraction of light may occur by the mask 1400 of FIG. 1. Due to this distortion, unlike the designer's intention, the first circuit pattern R1 to the fourth circuit pattern R4 may be actually printed on the wafer WF along the dotted lines of FIG. 2. When the distorted layout is printed on the wafer WF, a designed circuit may operate abnormally, not according to the designer's intention.

Optical proximity correction in accordance with an exemplary embodiment of the present inventive concept may be performed to prevent the distortion of a layout. In the optical proximity correction, a design layout may be biased to reduce an error between an actual layout to be actually printed based on the design layout and a target layout. An example of the optical proximity correction will now be described with reference to FIGS. 3 and 4.

Figure 3:
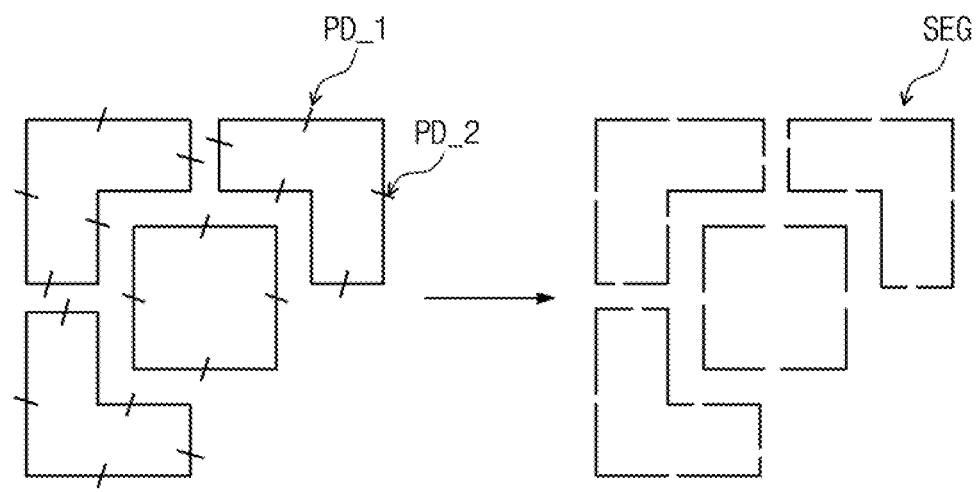
FIG. 3 is a diagram illustrating a procedure of dividing an outline of a layout into a plurality of segments in optical proximity correction, according to an exemplary embodiment of the inventive concept.

FIG. 3 is a diagram illustrating a procedure of dividing an outline of a layout into a plurality of segments in optical proximity correction, according to an exemplary embodiment of the inventive concept. For example, the procedure of dividing the outline of the design layout LO1 represented by the solid lines in FIG. 2 into a plurality of segments will now be described.

A plurality of division points may be set on the outline of the design layout LO1. For example, a first division point PD_1 and a second division point PD_2 may be set on the outline of the design layout LO1. A segment SEG may be obtained based on the first division point PD_1 and the second division point PD_2. Similarly, the outline of the design layout LO1 may be divided into a plurality of segments based on the plurality of division points.

The terms "divide" and "division" used herein may not mean physical division. Although a plurality of physically divided segments are shown in FIG. 3, they are conceptually provided for better understanding of the present inventive concept.

In the optical proximity correction according to an exemplary embodiment of the present inventive concept, each of the divided segments may be a biasing target. Each of the divided segments may be biased independently. For example, the segment SEG may be biased, independently from other segments, in one of a first direction (e.g., a positive direction or an outward direction) and a second direction (e.g., a negative direction or an inward direction). Each of the divided segments may be biased to reduce an error between an actual layout and a target layout.

For example, a Jacobian matrix "J" may be defined as the Equation (1) below to perform optical proximity correction. When the outline of the design layout LO1 are divided into K segments (e.g., K being an integer greater than 1), the Jacobian matrix "J" may have a size of K×K.

$$J = \begin{pmatrix} \frac{\partial f_1}{\partial x_1} & \frac{\partial f_1}{\partial x_2} & \cdots & \frac{\partial f_1}{\partial x_K} \\ \frac{\partial f_2}{\partial x_1} & \frac{\partial f_2}{\partial x_2} & \cdots & \frac{\partial f_2}{\partial x_K} \\ \vdots & \vdots & \ddots & \vdots \\ \frac{\partial f_K}{\partial x_1} & \frac{\partial f_K}{\partial x_2} & \cdots & \frac{\partial f_K}{\partial x_K} \end{pmatrix} \quad \text{Equation (1)}$$

A denominator of each of elements in the Jacobian matrix "J" may mean the amount of a bias corresponding to a $t^{th}$ segment, and a numerator thereof may mean an influence on an $s^{th}$ segment by a bias of the $t^{th}$ segment (e.g., each of t and s being an integer between 1 and K). For example, an operation using an inverse of the Jacobian matrix "J" in the Equation (1) (e.g., an operation using a Newton method, or the like) may be performed to calculate bias values respectively corresponding to the K segments. The process of calculating the bias values respectively corresponding to the K segments may be repeated until an error between an actual layout and a target layout becomes no more than an allowable level.

The K segments may be biased based on the calculated bias values, respectively. An example of an updated design layout obtained based on the biased segments will now be described below with reference to FIG. 4.

Figure 4:
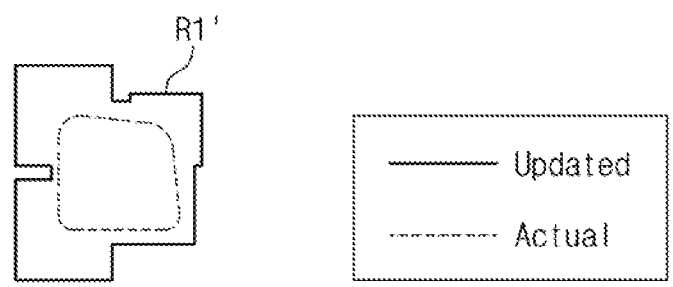
FIG. 4 is a diagram illustrating a layout updated by optical proximity correction, according to an exemplary embodiment of the inventive concept.

FIG. 4 is a diagram illustrating a layout updated by optical proximity correction, according to an exemplary embodiment of the inventive concept. To help understanding of the present inventive concept, for example, a new first circuit pattern R1' updated from the first circuit pattern R1 of FIG. 2 will be described. For brevity of description, descriptions corresponding to the second circuit pattern R2 to the fourth circuit pattern R4 of FIG. 2 will be omitted below.

In FIG. 4, a dotted line may represent the new circuit pattern R1' included in an updated design layout. According to the procedure described with reference to FIG. 3, the outline of the first circuit pattern R1 of FIG. 2 may be divided into a plurality of segments and each of the divided segments may be biased. As shown in FIG. 4, each of the segments may be biased in one of a first direction (e.g., a positive direction or an outward direction) and a second direction (e.g., a negative direction or an inward direction). Thus, the new first circuit pattern R1' may be obtained.

Each of the divided segments may be biased to reduce an error between an actual layout and a target layout. For example, the dotted line of FIG. 4 may represent an actual layout to be actually printed based on an updated design layout. An error between the actual layout and a target layout may be reduced by biasing each of the divided segments.

Referring to FIGS. 2 and 3, a left upper segment, a left lower segment, and a right upper segment of the first circuit pattern R1 may have the same surrounding condition. In other words, in FIGS. 2 and 3, segments are present near the left upper segment, the left lower segment, and the right upper segment of the first circuit pattern R1, while no segments are located as near the right lower segment of the first circuit pattern R1. Referring to the Equation (1), a bias value of a certain segment may be calculated by considering an influence that occurs due to biases of surrounding segments. Thus, it may be desirable for the left upper segment, the left lower segment, and the right upper segment of the first circuit pattern R1 to have the same bias value. Nonetheless, it can be seen from FIG. 4 that a left upper segment, a left lower segment, and a right upper segment of the new first circuit pattern R1' are asymmetrically biased.

It is understood that FIGS. 2 to 4 are merely exemplary. For example, in general optical proximity correction, an error of a numeric operation may result such that segments having the same surrounding condition may be differently biased. In particular, as the processes of calculating the bias values respectively corresponding to the divided segments are repeated, the error may be accumulated. When a distorted design layout is printed on the wafer WF of FIG. 1 due to the accumulated error, a designed circuit may operate abnormally, not in accordance with a designer's intention.

However, in exemplary embodiments of the present inventive concept, the same (or common) bias value may be assigned to segments having the same surrounding condition. As a result, optical proximity correction in accordance with an exemplary embodiment of the present invention may be performed more efficiently and uniformly. Moreover, a mask may be fabricated to include more precise image patterns.

Figure 5:
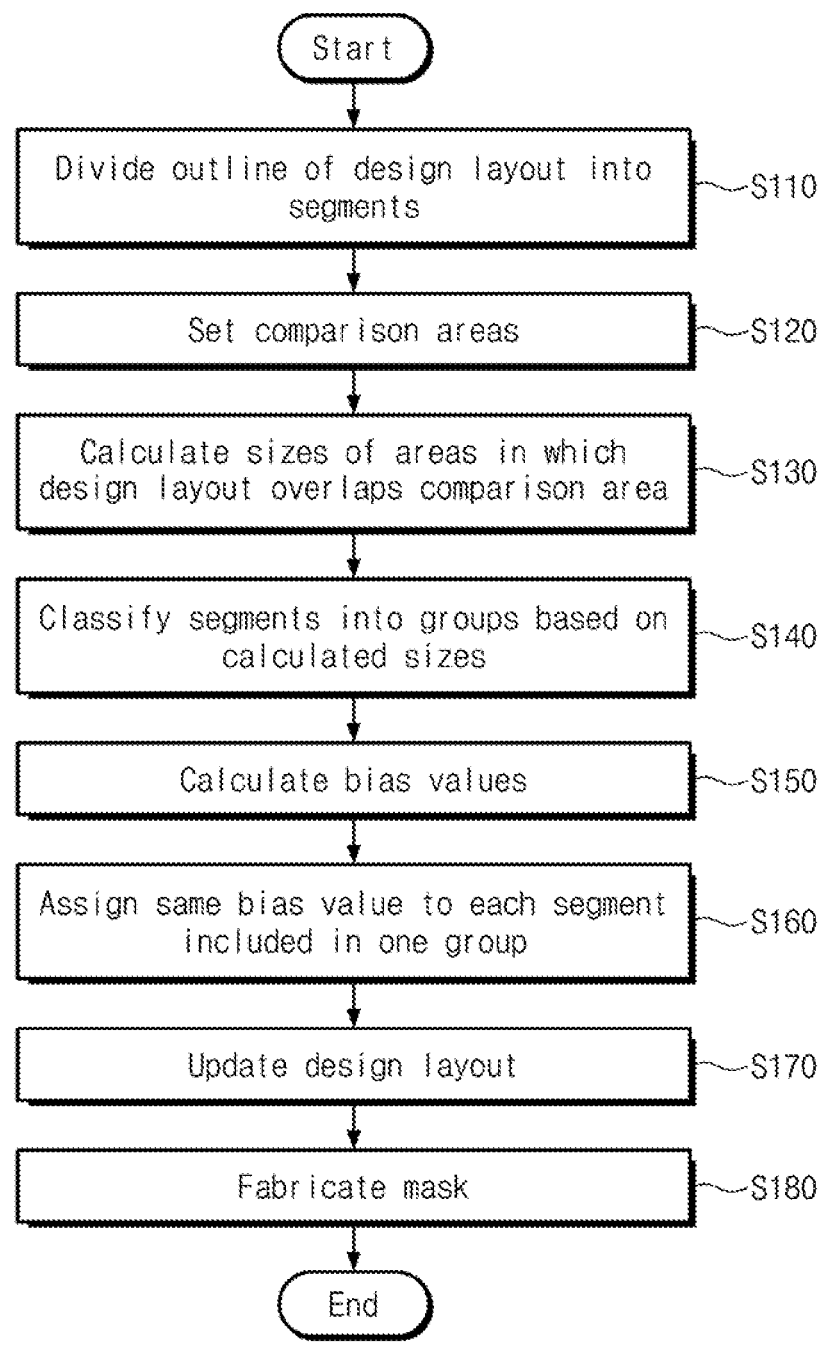
FIG. 5 is a flowchart describing a method of fabricating a mask, according to an exemplary embodiment of the inventive concept.

FIG. 5 is a flowchart describing a method of fabricating a mask, according to an exemplary embodiment of the inventive concept.

In operation S110, an outline of a design layout, (e.g., an initial design layout provided as a target layout), for example, the solid lines of FIG. 2, may be divided into a plurality of segments. The division into the segments has been described with reference to FIG. 3.

In operation S120, one or more comparison areas may be set. Each of the comparison areas may be formed at a specific point. In an exemplary embodiment of the inventive concept, the comparison areas may be formed at an evaluation point corresponding to each of the divided segments. The comparison areas may be different from one another. An example of the comparison area will be described with reference to FIG. 6.

In operation S130, an area of an overlap between the design layout and each of the comparison areas may be calculated. Calculating the overlapping area may be performed for each of the divided segments. Calculating the overlapping area will be described with reference to FIGS. 7 to 10.

In operation S140, the divided segments may be classified into a plurality of groups. The divided segments may be classified based on the calculated overlapping area in operation S130. For example, the divided segments may be classified into the groups such that segments having a characteristic of the same overlapping area are included together in one group. As will be described again later, segments having the same surrounding condition may have a characteristic of the same overlapping area. Accordingly, the segments having the same surrounding condition may be included in one group together. Classifying the divided segments will be described with reference to FIG. 11.

In operation S150, bias value respectively corresponding to some or all of the divided segments may be calculated. For example, calculating the bias values may be performed using an inverse of the Jacobian matrix "J" in the Equation (1).

In operation S160, the bias values may be assigned to the divided segments. In an exemplary embodiment of the present inventive concept, the same bias value may be assigned to one or more segments included in each of the groups based on the bias values calculated in operation S150. In other words, the same bias value may be assigned to each of the segments included in one group.

One group may include segments having the same surrounding condition. Accordingly, in operation S160, the same (or common) bias value may be assigned to the segments having the same surrounding condition. As a result, the optical proximity correction of the present inventive concept may be performed more efficiently and uniformly. Exemplary embodiments associated with assigning the same bias value will be described with reference to FIGS. 12 to 15.

In operation S170, the design layout may be updated. The divided segments may be biased as much as the amounts corresponding to the bias values assigned in the operation S160. Thus, the outline of the design layout may be changed and an updated design layout may be obtained. Updating the design layout has been described with reference to FIG. 4. However, unlike the illustration of FIG. 4, segments having the same surrounding condition may be biased by the same amount (e.g., symmetrically) according to an exemplary embodiment of the inventive concept.

In operation S180, a mask may be fabricated. The mask may be fabricated to include image patterns corresponding to the design layout updated in the operation S170. Thus, the mask may be fabricated to include more precise image patterns.

However, when an error between the actual layout and the target layout exceeds an allowable level, operations S150 to S170 may be repeatedly performed. In other words, when the error exceeds the allowable level, operations of assigning bias values to segments and correcting positions of the segments may be repeatedly performed. These operations may be repeated until the error becomes no more than the allowable level. In this case, the mask may be fabricated based on the finally updated design layout. Thus, the mask may be fabricated to include more precise image patterns.

Figure 6:
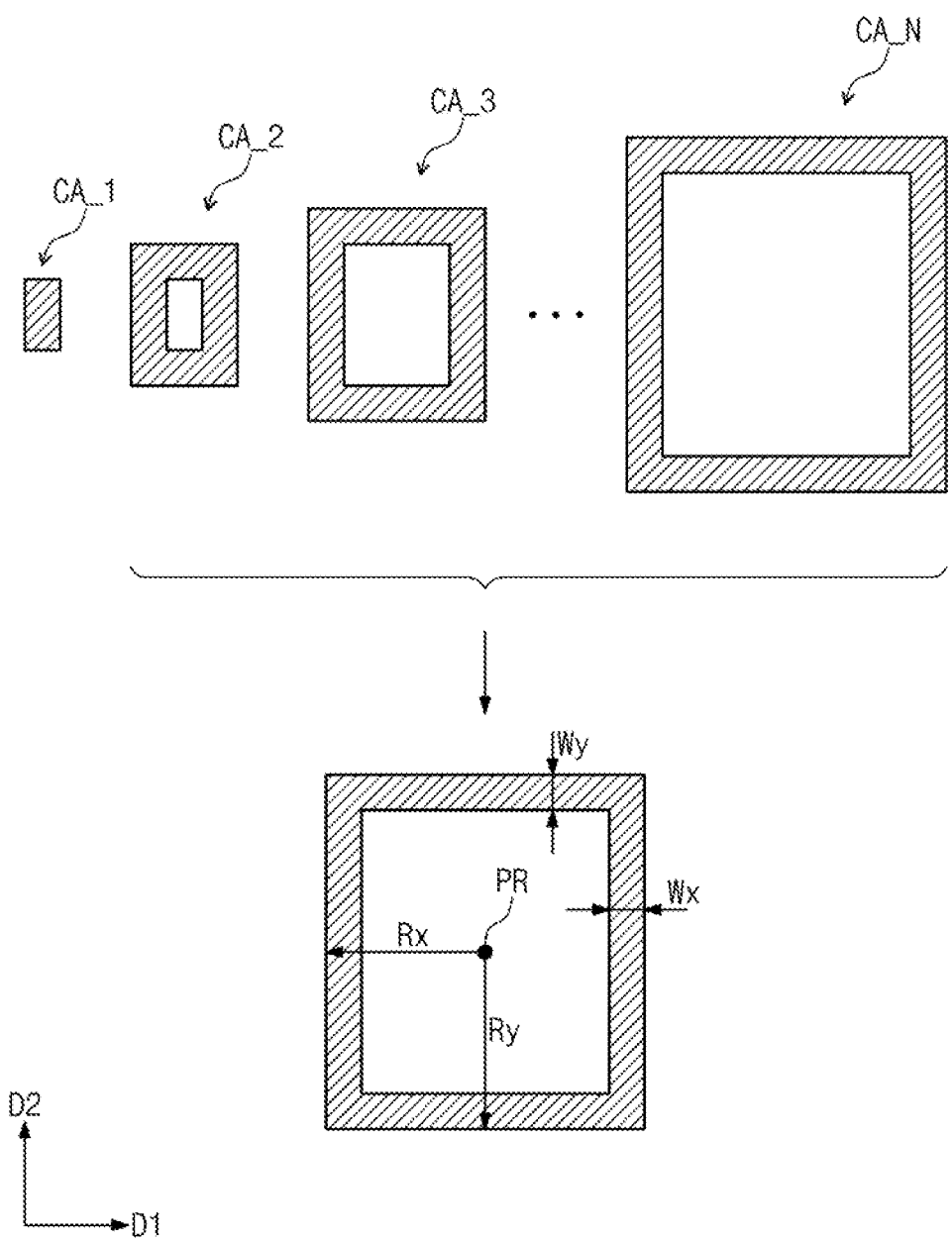
FIG. 6 is a diagram illustrating a comparison area, according to an exemplary embodiment of the inventive concept.

FIG. 6 is a diagram illustrating a comparison area, according to an exemplary embodiment of the inventive concept. For example, one or more comparison areas set in operation S120 of FIG. 5 may include a first comparison area CA_1 to an $N^{th}$ comparison area CA_N (e.g., N being an integer greater than or equal to 2).

For example, the first comparison area CA_1 may have a shape of a square. For example, each of the second comparison area CA_2 to the $N^{th}$ comparison area CA_N may have a shape of a square ring. As shown in FIG. 6, the comparison areas may be different from one another.

In an exemplary embodiment of the inventive concept, an area of the first comparison area CA_1 may be smaller than or equal to an area of an empty space inside the second comparison area CA_2. The empty space may correspond to the unhatched area of CA_2 in FIG. 6. Moreover, the external outline of the second comparison area CA_2 may be included in the internal outline of the third comparison area CA_3. In other words, an external outline of the first comparison area CA_1 may be smaller than or equal to the empty space of the second comparison area CA_2, and the external outline of the second comparison area CA_2 may be smaller than or equal to an empty space of the third comparison area CA_3. The comparison areas CA_1 to CA_N may be concentric shapes. In such a manner, the comparison areas CA_1 to CA_N may not overlap one another.

In an exemplary embodiment of the inventive concept, the square ring shape of each of the second comparison area CA_2 to the $N^{th}$ comparison area CA_N may be defined based on a first ring width Wx, a second ring width Wy, a first shortest distance Rx, and a second shortest distance Ry. The first ring width Wx may be the width of a square ring along a first direction D1, and the second ring width Wy may be the width of a square ring along a second direction D2.

In an exemplary embodiment of the inventive concept, each of the comparison areas CA_1 to CA_N may have a reference point PR as a center. For example, the reference point PR is a center of the first comparison area CA_1, a center of the second comparison area CA_2, and a center of the third comparison area CA_3. The first shortest distance Rx may be distance, along the first direction D1, from the reference point PR to the external outline. The second shortest distance Ry may be distance, along the second direction D2, from the reference point PR to the external outline. In an exemplary embodiment of the inventive concept, the reference point PR may be selected not as the center of a comparison area but as another point located elsewhere.

In an exemplary embodiment of the inventive concept, the first ring width Wx and the second ring width Wy may be determined or adjusted by a process resolution. The process resolution may be associated with minimum distance required to distinguish adjacent circuit patterns. As the process resolution becomes higher, adjacent circuit patterns may be distinguished at shorter distance. In an exemplary embodiment of the inventive concept, when the process resolution is high, each of the first and second ring widths Wx and Wy may have a small value. When the process resolution is low, each of the first and second ring widths Wx and Wy may have a large value.

In an exemplary embodiment of the inventive concept, the first shortest distance Rx may be w times the first ring width Wx, and the second shortest distance Ry may be w times the second ring width Wy (e.g., w being an integer between 2 and N). For example, in the third comparison area CA_3, the first shortest distance Rx may be three times the first ring width Wx and the second shortest distance Ry may be three times the second ring width Wy. According to this exemplary embodiment, the comparison areas CA_2 to CA_N may be set not to overlap one another.

In an exemplary embodiment of the inventive concept, the square ring shape of each of the second comparison area CA_2 to the $N^{th}$ comparison area CA_N may be defined further based on a ratio of the first shortest distance Rx to the second shortest distance Ry. According to this exemplary embodiment, a width-to-height ratio of a square ring may be adjusted.

However, the comparison areas CA_1 to CA_N are merely provided to help understanding of the present inventive concept and are not intended to limit the present incentive concept. For example, a comparison area may have a circular shape or another shape. For example, in an exemplary embodiment of the inventive concept, only the first comparison area CA_1 may be set. The shape of a comparison area and the number of comparison areas may be variously changed or modified.

FIGS. 7 to 10 are diagrams for describing a procedure of calculating an overlapping area between a comparison area and a layout, according to an exemplary embodiment of the inventive concept. For better understanding of the present inventive concept, the procedure of calculating an overlapping area between a design layout and each of the first comparison area CA_1 to the third comparison area CA_3 illustrated in FIG. 6 will be described below with reference to FIGS. 7 to 10.

As described above, the outline of a design layout may be divided into a plurality of segments. Each of the divided segments may have an evaluation point. The evaluation point may be set to evaluate a surrounding condition of a corresponding segment. The evaluation point may be selected based on various criteria. For example, a middle point of each of the divided segments may be selected as an evaluation point for each respective segment. A first evaluation point PE_1 is shown in FIGS. 7 to 9 as an example of the evaluation point.

For example, a reference point PR (see FIG. 6) used to set each of the comparison areas CA_1 to CA_3 may correspond to the evaluation point PE_1. When each of the comparison areas CA_1 to CA_3 has the reference point PR as its center, the comparison areas CA_1 to CA_3 share the first evaluation point PE_1 as the center. Each of the comparison areas CA_1 to CA_3 may be formed around the center of the first evaluation point PE_1. When the first evaluation point PE_1 is a middle point of a corresponding segment, each of the comparison areas CA_1 to CA_3 may be formed around the middle point PE_1.

Figure 7:
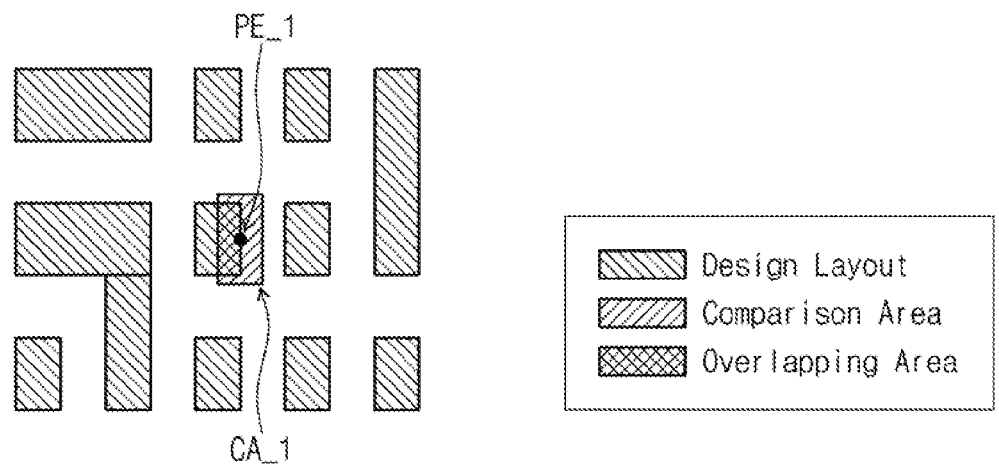
FIG. 7 is a diagram for describing a procedure of calculating an overlapping area between a comparison area and a layout, according to an exemplary embodiment of the inventive concept.

Referring to FIG. 7, the first comparison area CA_1 may be formed on the basis of the first evaluation point PE_1. For example, the first comparison area CA_1 may be formed around the center of the first evaluation point PE_1. In other words, the center of area of the first comparison area CA_1 is set to correspond to the first evaluation point PE_1. The first comparison area CA_1 may overlap a portion of the design layout. For example, as shown in FIG. 7, the first comparison area CA_1 may overlap half a circuit pattern included in the design layout. In an exemplary embodiment of the inventive concept, with reference to FIG. 7, a value of an overlapping area between the first comparison area CA_1 and the design layout may be, for example, 0.5.

Figure 8:
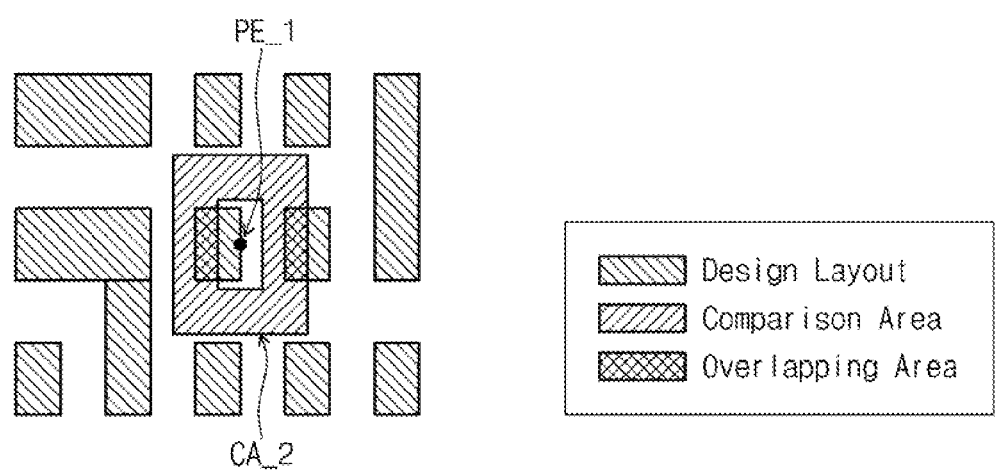
FIG. 8 is a diagram for describing a procedure of calculating an overlapping area between a comparison area and a layout, according to an exemplary embodiment of the inventive concept.
Figure 9:
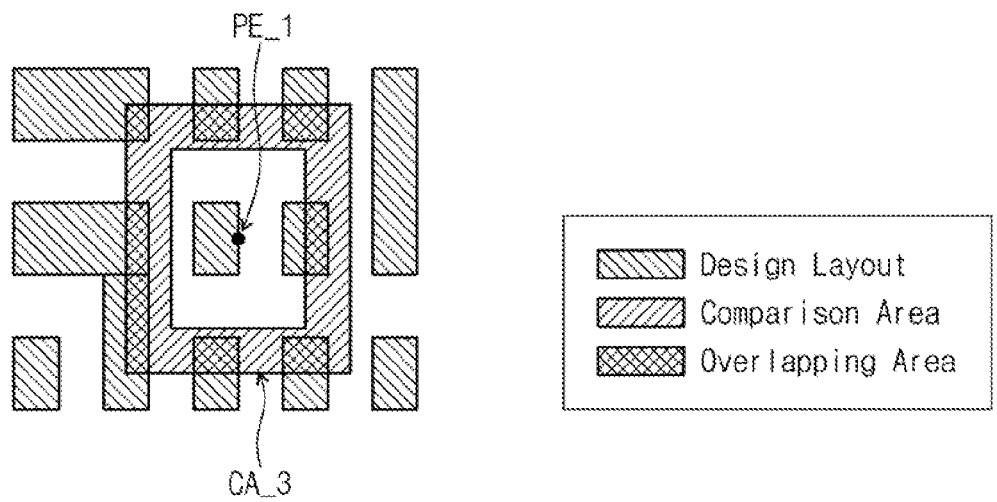
FIG. 9 is a diagram for describing a procedure of calculating an overlapping area between a comparison area and a layout, according to an exemplary embodiment of the inventive concept.

Referring to FIG. 8, the second comparison area CA_2 may be formed on the basis of the first evaluation point PE_1. For example, the second comparison area CA_2 may be formed around the center of the first evaluation point PE_1. The first comparison area CA_1 and the second comparison area CA_2 may share the first evaluation area PE_1 as the center. The second comparison area CA_2 may overlap a portion of the design layout. For example, as shown in FIG. 8, the second comparison area CA_2 may overlap a half of each one of two circuit patterns included in the design layout. In an exemplary embodiment of the inventive concept, with reference to FIG. 8, a value of an overlapping area between the second comparison area CA_2 and the design layout may be, for example, 1.0.

Referring to FIG. 9, the third comparison area CA_3 may be formed on the basis of the first evaluation point PE_1. For example, the third comparison area CA_3 may be formed around the center of the first evaluation point PE_1. The first comparison area CA_1 to the third comparison area CA_3 may share the first evaluation point PE_1 as the center. The third comparison area CA_3 may overlap a portion of the design layout. In an exemplary embodiment of the inventive concept, with reference to FIG. 9, a value of an overlapping area between the third comparison area CA_3 and the design layout may be, for example, about 4.0.

In such a manner, overlapping areas between a design layout and one or more comparison areas formed on the basis of the first evaluation point PE_1 may be calculated. A characteristic of an overlapping area of a segment corresponding to the first evaluation point PE_1 may be defined based on the calculated overlapping areas. For example, a characteristic vector such as an Equation (2) below may be used to define the characteristic of an overlapping area of the segment corresponding to the first evaluation point PE_1.

$$H_1 = \{0.5, 1.0, 4.0\} \qquad \text{Equation (2)}$$

In Equation (2), a characteristic vector $H_1$ may describe the characteristic of an overlapping area of the segment corresponding to the first evaluation point PE_1. An $h^{th}$ element of the characteristic vector $H_1$ may mean an overlapping area between the design layout and an $h^{th}$ comparison area formed on the basis of the first evaluation point PE_1. When a characteristic vector is defined as shown in Equation (2), the characteristic vector may be used to describe a surrounding condition of a corresponding segment. This is because characteristic vectors respectively corresponding to segments having the same surrounding condition may be identically expressed.

Figure 10:
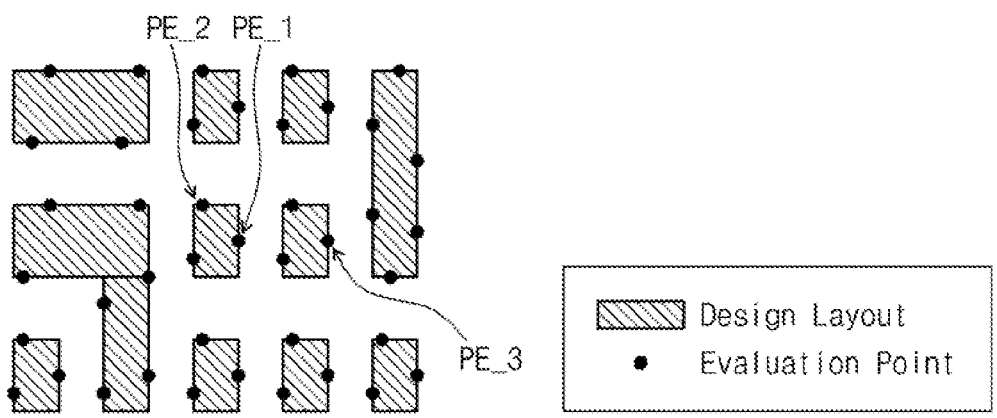
FIG. 10 is a diagram for describing a procedure of calculating an overlapping area between a comparison area and a layout, according to an exemplary embodiment of the inventive concept.

Referring to FIG. 10, a plurality of evaluation points are illustrated. As described above, each of the divided segments may have an evaluation point. Thus, multiple evaluation points may be set on a design layout, as shown in FIG. 10.

The procedure of calculating an overlapping area based on the comparison areas CA_1 to CA_3 described above may be performed at each of the plurality of evaluation points. Similar to the descriptions with reference to FIGS. 7 to 9, the procedure of setting the comparison areas CA_1 to CA_3 on the basis of an evaluation point and calculating an overlapping area between each of the comparison areas CA_1 to CA_3 and the design layout may be performed at each of the evaluation points (e.g., the second evaluation point PE_2, the third evaluation point PE_3, and the like) other than the first evaluation point PE_1.

For example, each of the first comparison area CA_1 to the third comparison area CA_3 may be formed around a center of the second evaluation point PE_2. The first comparison area CA_1 to the third comparison area CA_3 may share the second evaluation point PE_2 as a center. Moreover, an overlapping area between the design layout and each of the first comparison area CA_1 to the third comparison area CA_3 formed on the basis of the second evaluation point PE_2 may be calculated. The characteristic of an overlapping area of a segment corresponding to the second evaluation point PE_2 may be defined based on the calculated overlapping areas.

Similarly, characteristics of overlapping areas of segments respectively corresponding to the third evaluation point PE_3 and other evaluation points may be defined. To achieve this, the comparison areas CA_1 to CA_3 may be identically disposed with same shapes on the basis of each of the evaluation points respectively corresponding to the divided segments.

As described above, a characteristic of an overlapping area may mean a surrounding condition of a corresponding segment. Thus, segments having the same surrounding condition may have the same characteristic of an overlapping area. In an exemplary embodiment of the inventive concept, segments may be classified into a plurality of groups such that segments having the same characteristic of an overlapping area are included together in one group. Classifying the segments will be described with reference to FIG. 11.

FIGS. 7 to 10 are not intended to limit the present inventive concept. The number of comparison areas, a setting configuration of a comparison area, selection of an evaluation point, and calculation of an overlapping area may be variously changed or modified. Furthermore, a value of an overlapping area and use of a characteristic vector are just examples to help understanding of the present inventive concept. Exemplary embodiments of the present inventive concept may be variously changed or modified.

For example, the number of comparison areas may be determined or adjusted considering the range where a bias value assigned to each segment on a design layout is affected. For example, when a diameter where a bias value assigned to a specific segment on a design layout is affected is 1 micrometer, comparison areas may include an $N^{th}$ comparison area CA_N defined by the first shortest distance Rx (see FIG. 6) of 1 micrometer or the second shortest distance Ry (see FIG. 6) of 1 micrometer.

Figure 11:
FIG. 11 is a diagram for describing a procedure of classifying a plurality of segments into a plurality of groups, according to an exemplary embodiment of the inventive concept.

FIG. 11 is a diagram for describing a procedure of classifying a plurality of segments into a plurality of groups, according to an exemplary embodiment of the inventive concept. For example, the outline of a design layout may be divided into K segments SEG_1 to SEG_K, K being an integer greater than or equal to 2. For example, the K segments SEG_1 to SEG_K may be classified into P groups, P being an integer greater than or equal to 2, according to an exemplary embodiment of the inventive concept.

As described above, comparison areas CA_1 to CA_N may be set on the basis of an evaluation point corresponding to each of the K segments SEG_1 to SEG_K, and then an overlapping area between the design layout and each of the comparison areas CA_1 to CA_N may be calculated. FIG. 11 shows a correspondence relationship between the segments SEG_1 to SEG_K and the comparison areas CA_1 to CA_N. For example, a value of an overlapping area between the design layout and the first comparison area CA_1 set on the basis of an evaluation point corresponding to the first segment SEG_1 may be 0.5. Values shown in FIG. 11 are merely exemplary and are shown for understanding the present inventive concept.

As described above, a characteristic vector may be used to describe the characteristic of an overlapping area of each of the segments SEG_1 to SEG_K. When N comparison areas CA_1 to CA_N are used, a characteristic vector corresponding to an $e^{th}$ segment may be defined by Equation (3) below, e.g., e is an integer between 1 to K.

$$H_e = \{h_1, h_2, \ldots, h_N\} \quad \text{Equation (3)}$$

For example, in the example of FIG. 11, characteristic vectors corresponding to the first segment SEG_1, the second segment SEG_2, and the $K^{th}$ segment SEG_K may be expressed by Equation (4), Equation (5), and Equation (6) below, respectively.

$$H_1 = \{0.5, 1.0, \ldots, 4.0\} \quad \text{Equation (4)}$$

$$H_2 = \{0.5, 1.0, \ldots, 4.0\} \quad \text{Equation (5)}$$

$$H_K = \{2.5, 1.0, \ldots, 1.5\} \quad \text{Equation (6)}$$

Referring to the Equation (4) and the Equation (5), the characteristic vector corresponding to the first segment SEG_1 and the characteristic vector corresponding to the second segment SEG_2 are identical. This means that the first segment SEG_1 and the second segment SEG_2 may have the same surrounding condition. Referring to the Equation (6), the characteristic vector corresponding to the $K^{th}$ segment SEG_K is different from the characteristic vectors corresponding to the first segment SEG_1 and the second segment SEG_2. This means that the $K^{th}$ segment may have a different surrounding condition from those of the first segment SEG_1 and the second segment SEG_2.

In an exemplary embodiment of the inventive concept, segments having the same surrounding condition may be classified into a single group. For example, in the example of FIG. 11, the first segment SEG_1 and the second segment SEG_2 may be included together in a first group. The $K^{th}$ segment SEG_K may be included in a $P^{th}$ group separately from the first segment SEG_1 and the second segment SEG_2.

For example, when an $X^{th}$ segment SEG_X has the same surrounding condition as the first segment SEG_1 and the second segment SEG_2, the $X^{th}$ segment SEG_X may be included in the first group together with the first segment SEG_1 and the second segment SEG_2. For example, when an $Y^{th}$ segment SEG_Y has the same surrounding condition as the $K^{th}$ segment, the $Y^{th}$ segment SEG_Y may be included in the $P^{th}$ group together with the $K^{th}$ segment SEG_K. In some cases, a second group may include only one segment (e.g., the third segment SEG_3).

Accordingly, the K segments SEG_1 to SEG_K may be classified into the P groups based on the characteristic of an overlapping area. Segments having the same surrounding condition may be included in one group together. In an exemplary embodiment of the inventive concept, the same bias value may be assigned to one or more segments included together in one group. Exemplary embodiments of the inventive concept associated with assigning the same bias value will be described below with reference to FIGS. 12 to 15.

Figure 12:
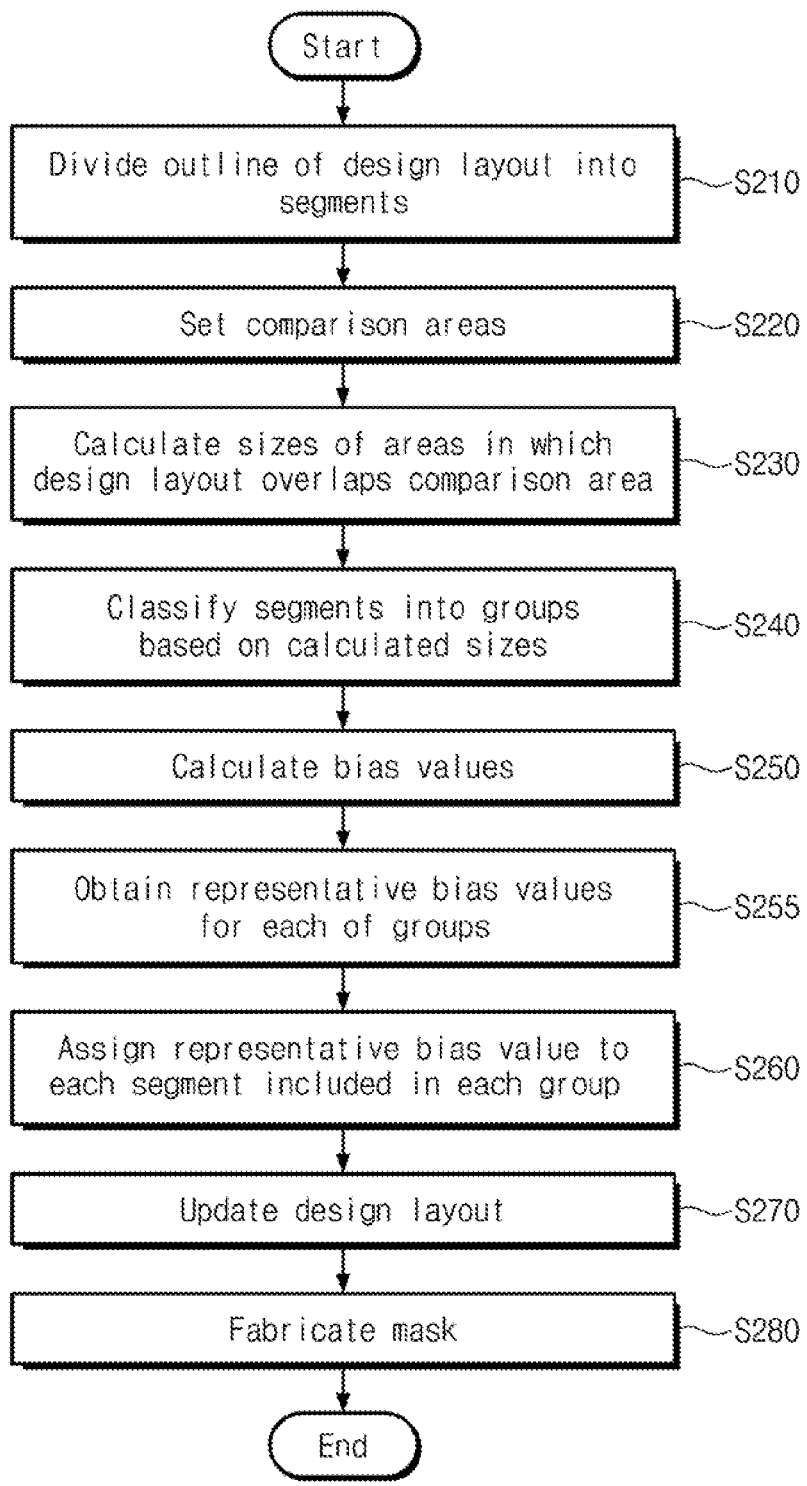
FIG. 12 is a flowchart describing a method of fabricating a mask, according to an exemplary embodiment of the inventive concept.

FIG. 12 is a flowchart describing a method of fabricating a mask, according to an exemplary embodiment of the inventive concept.

In operation S210, the outline of a design layout may be divided into a plurality of segments, as described with reference to FIG. 3. In operation S220, one or more comparison areas may be set, as described with reference to FIGS. 6 to 10. In operation S230, an overlapping area between each of the comparison areas and the design layout may be calculated, as described with reference to FIGS. 7 to 10. In operation S240, the divided segments may be classified into a plurality of groups, as described with reference to FIG. 11.

In operation S250, bias values respectively corresponding to the divided segments may be calculated. For example, bias values respectively corresponding to all the divided segments may be calculated.

In operation S255, "representative bias values" respectively corresponding to the classified groups may be obtained. The representative bias values may be obtained based on the bias values respectively corresponding to one or more segments included in each classified group. For example, the representative bias value may have an average of the bias values obtained with respect to one or more segments included in a corresponding group. In this example, when a first group includes a first segment to a tenth segment, a representative bias value corresponding to the first group may have an average of bias values of the first segment to the tenth segment. However, the present inventive concept is not limited by this example. In an exemplary embodiment of the inventive concept, the representative bias value of a group may be selected to be one of the bias values of the one or more segments included in the group.

In operation S260, a representative bias value of a group including one or more divided segments may be assigned to the each of the divided segments included in that group. In other words, the representative bias value of a group may be assigned each segment included in that group. For example, when a first group includes a first segment to a tenth segment, a representative bias value corresponding to the first group may be assigned to each of the first to the tenth segments. Thus, the same bias value (e.g., the group's representative bias value) may be assigned to one or more segments included together in one group.

In operation S270, the design layout may be updated. The divided segments may be biased by as much as the amounts corresponding to the representative bias values assigned in operation S260. Thus, the outline of the design layout may be changed and the updated design layout may be obtained. A mask may be fabricated in operation S280. The mask may be fabricated to include image patterns corresponding to the design layout updated in operation S270.

Figure 13:
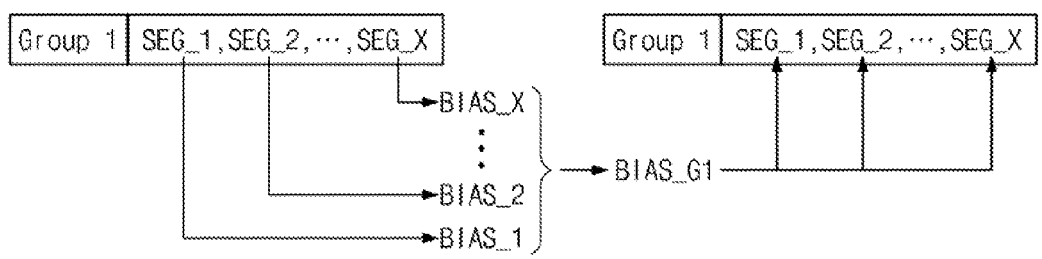
FIG. 13 is a diagram for describing a procedure of assigning representative bias values to a plurality of segments according to the method of FIG. 12.

FIG. 13 is a diagram for describing a procedure of assigning representative bias values to a plurality of segments according to the method of FIG. 12, according to an exemplary embodiment of the inventive concept.

For example, among a plurality of groups, a first group may include at least a first segment SEG_1, a second segment SEG_2, and an $X^{th}$ segment SEG_X. In operation S250 of FIG. 12, a first bias value BIAS_1 corresponding to the first segment SEG_1, a second bias value BIAS_2 corresponding to the second segment SEG_2, and an $X^{th}$ bias value BIAS_X corresponding to the $X^{th}$ segment SEG_X may be calculated. In operation S255 of FIG. 12, a representative bias value BIAG_G1 corresponding to the first group may be obtained based on the first bias value BIAS_1, the second bias value BIAS_2, and the $X^{th}$ bias value BIAS_X.

In operation S260 of FIG. 12, the representative bias value BIAS_G1 may be assigned to the first segment SEG_1, the second segment SEG_2, and the $X^{th}$ segment SEG_X. Thus, the same bias value may be assigned to segments included in the first group.

In such a manner, representative bias values respectively corresponding to other groups in addition to the first group may be obtained. Each of the obtained representative bias values may be commonly assigned to segments included in a corresponding group. Thus, the same bias value may be assigned to one or more segments included in one group together. As a result, optical proximity correction in accordance with an exemplary embodiment of the present inventive concept may be performed more uniformly. Moreover, a mask including precise image patterns may be fabricated.

Figure 14:
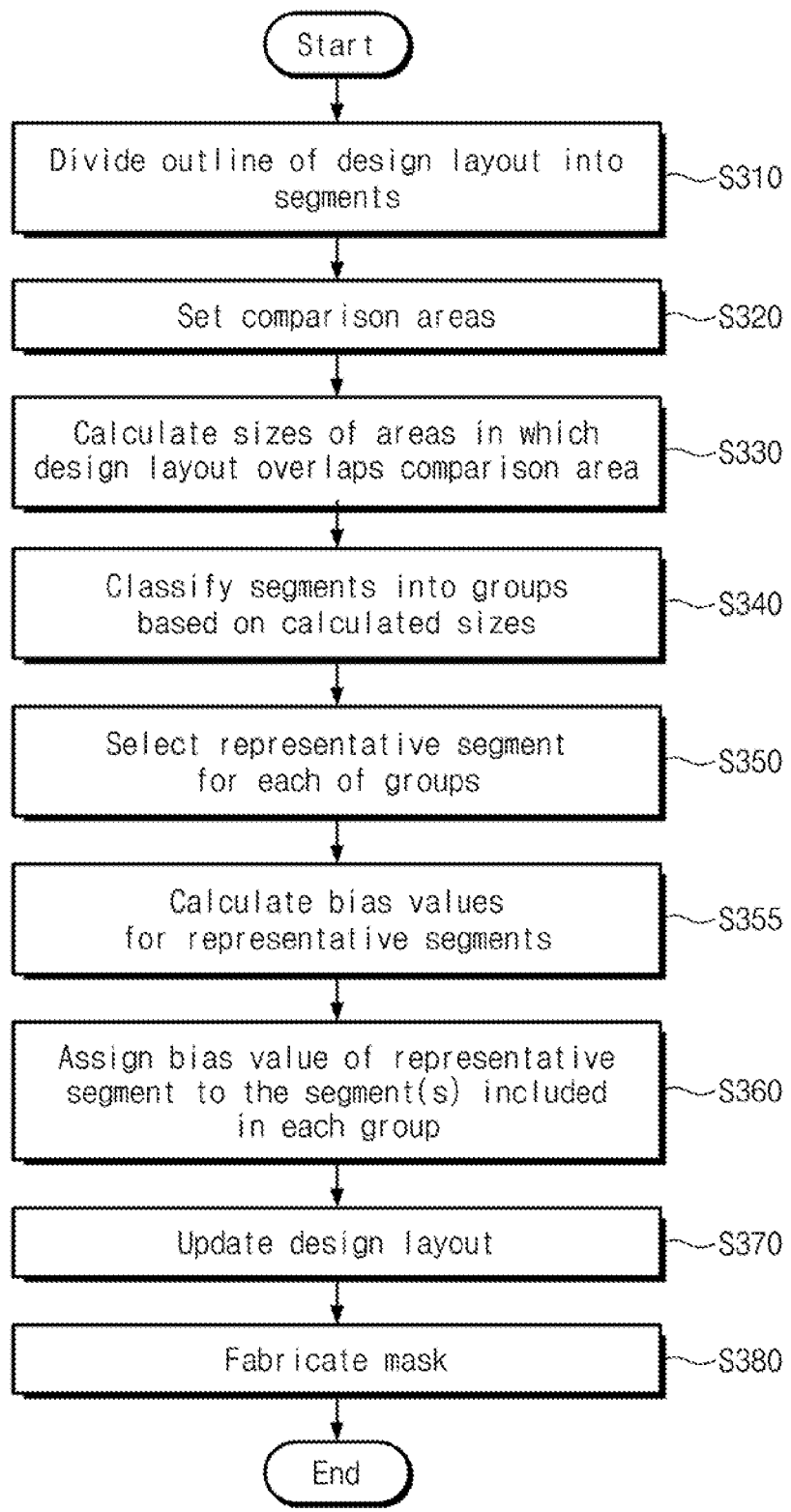
FIG. 14 is a flowchart describing a method of fabricating a mask, according to an exemplary embodiment of the inventive concept.

FIG. 14 is a flowchart describing a method of fabricating a mask, according to an exemplary embodiment of the inventive concept.

In operation S310, the outline of a design layout may be divided into a plurality of segments, as described with reference to FIG. 3. In operation S320, one or more comparison areas may be set, as described with reference to FIGS. 6 to 10. In operation S330, an overlapping area between each of the comparison areas and the design layout may be calculated, as described with reference to FIGS. 7 to 10. In operation S340, the divided segments may be classified into a plurality of groups, as described with reference to FIG. 11.

In operation S350, representative segments may be selected for the classified groups. For example, among one or more segments included in each classified group, a representative segment may be selected for each classified group. For example, when a first group includes a first segment to a tenth segment, the first segment may be selected as a representative segment of the first group. A representative segment may be selected based on various criteria. For example, a segment closest to the center of the design layout may be selected as a representative segment, but the present inventive concept is not limited by this example.

In operation S355, bias values respectively corresponding to the selected representative segments may be calculated. In other words, bias values corresponding to some of the divided segments may be calculated.

In operation S360, a bias value of a representative segment may be assigned to one or more segments, or all segments, included in the same group as the representative segment. In other words, the bias value of a representative segment may be assigned to some or all other segments included in that group. This may be done for each group. For example, when the first group includes the first segment to the tenth segment and the first segment is selected as a representative segment of the first group, a bias value calculated for the first segment may be assigned to the second segment to the tenth segment, because the second segment to the tenth segment are included in the first group together with the first segment. Thus, the same bias value (e.g., a bias value corresponding to a representative segment) may be assigned to one or more segments included in one group together.

In operation S370, the design layout may be updated. The divided segments may be biased by as much as the amounts corresponding to the bias values assigned in operation S360.

Thus, the outline of the design layout may be changed and the updated design layout may be obtained. In operation S380, a mask may be fabricated to include image patterns corresponding to the design layout updated in operation S370.

Figure 15:
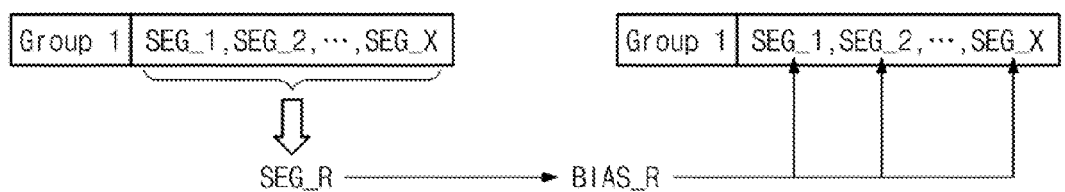
FIG. 15 is a diagram for describing a procedure of assigning bias values of representative segments to a plurality of segments according to the method of FIG. 14.

FIG. 15 is a diagram for describing a procedure of assigning bias values of representative segments to a plurality of segments according to the method of FIG. 14, according to an exemplary embodiment of the inventive concept.

For example, among a plurality of groups, a first group may include at least a first segment SEG_1, a second segment SEG_2, and an $X^{th}$ segment SEG_X. In operation S350 of FIG. 14, among the first segment SEG_1, the second segment SEG_2, and the $X^{th}$ segment SEG_X, the first segment SEG_1 may be selected as a representative segment SEG_R. In operation S355 of FIG. 14, a bias value BIAS_R of the representative segment SEG_R may be calculated.

In operation S360 of FIG. 14, the bias value BIAS_R of the representative segment SEG_R may be assigned to the first segment SEG_1, the second segment SEG_2, and the Xth segment SEG_X. Thus, the same bias value may be assigned to segments included in the first group.

In such a manner, representative segments may be selected for groups other than the first group. The bias values of the representative segments may be commonly assigned to segments included in the same group as the representative segments, respectively. Thus, the same bias value may be assigned to one or more segments included together in one group. As a result, optical proximity correction may be performed more uniformly. In addition, a mask including more precise image patterns may be fabricated based on a result of the optical proximity correction.

According to the exemplary embodiments described with reference to FIGS. 14 and 15, bias values corresponding to some of the divided segments (e.g., representative segments) may be calculated. In other words, not all of the divided segments need to be considered during calculation of the bias values. Instead, only the representative segments selected from the respective classified groups may be considered. Accordingly, a size of the Jacobian matrix "J" in the above Equation (1) may be reduced (e.g., from (K by K) to (G by G), wherein G represents a non-zero positive integer smaller than K). As a result, the number of operations performed to calculate bias values may decrease, and optical proximity correction may be performed more efficiently.

Figure 16:
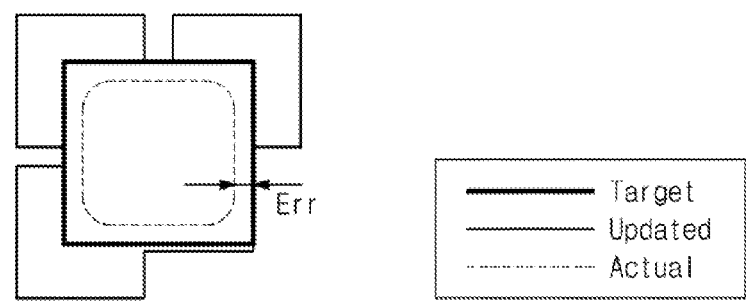
FIG. 16 is a diagram for describing an error of an updated layout, according to an exemplary embodiment of the inventive concept.

FIG. 16 is a diagram for describing an error of an updated layout, according to an exemplary embodiment of the inventive concept. In FIG. 16, thick solid lines may represent a target layout intended to be printed on the wafer WF in FIGS. 1, and thin solid lines may represent a design layout designed to print the target layout. Further, dotted lines may represent an actual layout actually printed on the wafer WF of FIG. 1.

It may be desirable to print the target layout on the wafer WF of FIG. 1. However, as described above, various distortions may occur in a semiconductor process. For this reason, the outline of the design layout designed to print the target layout may be biased and updated according to the exemplary embodiments described with reference to FIGS. 2 to 15. The actual layout may be obtained based on the updated design layout.

However, limitations of the semiconductor process may keep an actual layout from perfectly matching a target layout. Thus, an error Err between the actual layout and the target layout may occur.

In an exemplary embodiment of the inventive concept, an allowable level of the error Err may be set. This way, a designed circuit may normally operate according to a designer's intention. For example, the allowable level of the error Err may be selected to be a level where a designed circuit operates normally. For example, the allowable level of the error Err may be automatically set during a process. In addition, the allowable level of the error Err may be manually set by a designer. In an exemplary embodiment of the inventive concept, an operation of determining whether the error Err is within the allowable level may be further performed.

For example, between operations S270 and S280 of FIG. 12, determining whether the error Err is within the allowable level may be performed. When the error Err is within the allowable level, a mask may be fabricated in operation S280. When the error Err is not within the allowable level, the updated design layout may be further updated. Operations S250, S255, S260, and S270 may be re-performed on the updated design layout to further update the updated design layout. Operations S250, S255, S260, and S270 may be repeated until the error Err falls within the allowable level.

For example, between operations S370 and S380 of FIG. 14, determining whether the error Err is within the allowable level may be performed. When the error Err is within the allowable level, a mask may be fabricated in operation S380. When the error Err is not within the allowable level, the updated design layout may be further updated. Operations S355, S360, and S370 may be re-performed on the updated design layout to further update the updated design layout. Operations S355, S360, and S370 may be repeated until the error Err falls within the allowable level.

Figure 17:
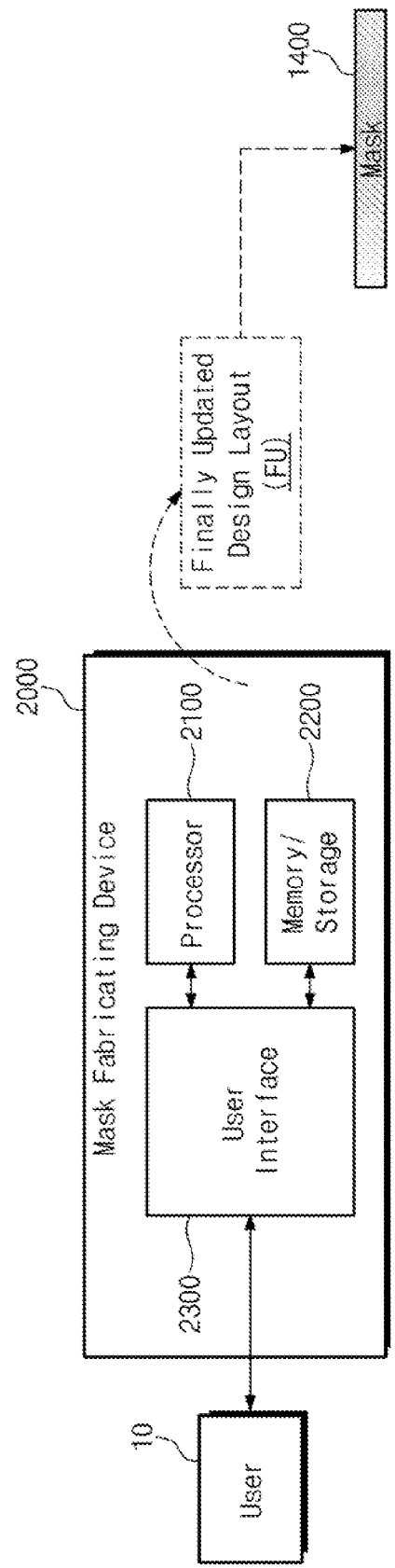
FIG. 17 is a block diagram of a mask fabricating device operating according to an exemplary embodiment of the inventive concept.

FIG. 17 is a block diagram of a mask fabricating device operating according to an exemplary embodiment of the inventive concept. A mask fabricating device 2000 may include a processor 2100, a memory/storage 2200, and a user interface 2300. The mask fabricating device 2000 may be used to fabricate a mask 1400 according to the exemplary embodiments of the inventive concept described with reference to FIGS. 2 to 16.

The processor 2100 may include at least one of a general-purposed processor, and a special-purposed processor such as a workstation processor. The processor 2100 may perform various numerical operations and/or logical operations to perform dividing, setting, calculating, classifying, obtaining, assigning, and updating as described with reference to FIGS. 2 to 16. The processor 2100 may include one or more processor cores. For example, a processor core of the processor 2100 may include a special-purposed logic circuit (e.g., a field programmable gate array (FPGA), application specific integrated chips (ASICs), or the like).

The memory/storage 2200 may temporarily or semi-permanently store data processed or to be processed by the processor 2100. For this purpose, the memory/storage 2200 may include at least one of a volatile memory such as a dynamic random access memory (DRAM), a static random access memory (SRAM), and a synchronous DRAM (SDRAM), and/or a nonvolatile memory device such as a flash memory, a phase-change random access memory (RAM) (PRAM), a magneto-resistive RAM (MRAM), a resistive RAM (ReRAM), and a ferroelectric RAM (FRAM).

The exemplary embodiments of the inventive concept described with reference to FIGS. 2 to 16 may be implemented according to the operations of the processor 2100 and the memory/storage 2200. The mask fabricating device 2000 may be used to fabricate the mask 1400 according to the operations of the processor 2100 and the memory/storage 2200.

The mask fabricating device 2000 may execute a software program according to the operations of the processor 2100 and the memory/storage 2200. For example, the software program may include an operating system (OS) and/or an application program. The OS may provide one or more services to the application program and may act as an intermediary between the application program and components of the mask fabricating device 2000. For example, the application program may include a design program used to design a layout according to the exemplary embodiments of the inventive concept described with reference to FIGS. 2 to 16.

The user interface 2300 may operate to provide a user 10 with a result obtained by the operations of the processor 2100 and the memory/storage 2200. In addition, the user interface 2300 may be used to receive various data (e.g., data associated with a design of a layout, data associated with an allowable level of an error, or the like) from the user 10. For example, the user 10 may be a designer of the mask 1400 and the layout. The user interface 2300 may include an input/output interface such as a display device, a speaker, a keyboard, and a mouse.

The mask fabricating device 2000 may output a finally updated design layout FU according to the exemplary embodiments of the inventive concept described with reference to FIGS. 2 to 16. The mask fabricating device 2000 may fabricate the mask 1400 based on the finally updated design layout FU. The mask 1400 may be fabricated including image patterns corresponding to the finally updated design layout FU.

Figure 18:
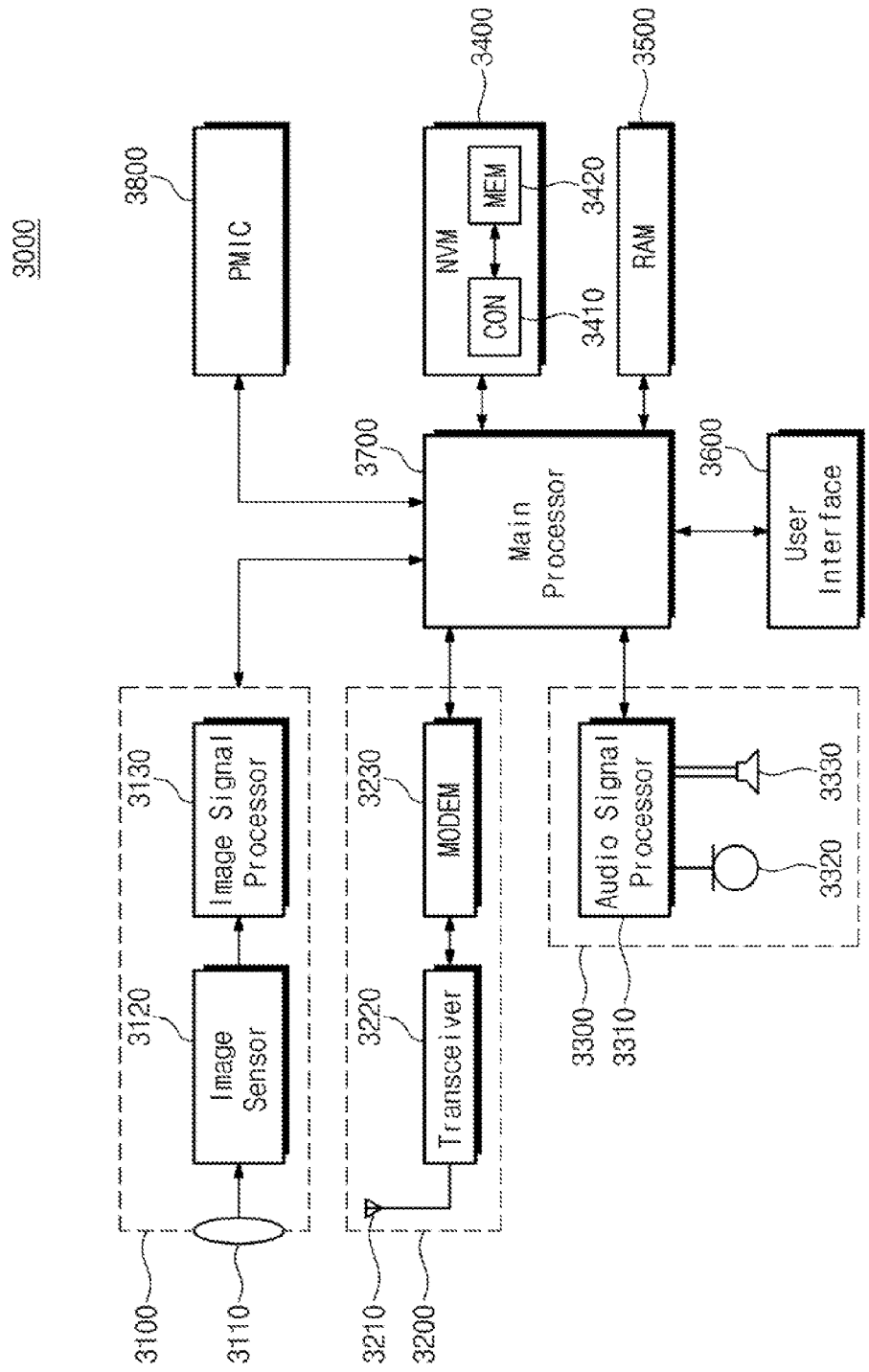
FIG. 18 is a block diagram of a mobile electronic device including a chip or circuit implemented using a mask fabricated according to an exemplary embodiment of the inventive concept.

FIG. 18 is a block diagram of a mobile electronic device including a chip or circuit implemented using a mask fabricated according to an exemplary embodiment of the inventive concept. A mobile electronic device 3000 may include an image processor 3100, a wireless communication block 3200, an audio processor 3300, a nonvolatile memory (NVM) 3400, a RAM 3500, a user interface 3600, a main processor 3700, and a power management integrated circuit (PMIC) 3800. In an exemplary embodiment of the inventive concept, the mobile electronic device 3000 may be one of a portable terminal, a personal digital assistant (PDA), a portable multimedia player (PMP), a digital camera, a smartphone, a tablet computer, a wearable device, or the like.

The image processor 3100 may receive light through a lens 3110. An image sensor 3120 and an image signal processor 3130 included in the image processor 3100 may generate an image based on the received light.

The wireless communication block 3200 may include an antenna 3210, a transceiver 3220, and a modem 3230. The wireless communication block 3200 may communicate with an external entity of the mobile electronic device 3000 according to one or more of various wireless communication protocols, such as long term evolution (LTE), worldwide interoperability for microwave access (WiMax), global system for mobile communication (GSM), code division multiple access (CDMA), Bluetooth, near field communication (NFC), wireless fidelity (WiFi), radio frequency identification (RFID), or the like.

The audio processor 3300 may process an audio signal by means of an audio signal processor 3310. The audio processor 3300 may receive an audio input through a microphone 3320 or may provide an audio output through a speaker 3330.

The NVM 3400 may store data that is required to be retained irrespective of whether power is supplied. For example, the NVM 3400 may include at least one of a flash memory, a PRAM, an MRAM, a ReRAM, an FRAM, and any combination thereof.

The RAM 3500 may store data used to operate the mobile electronic device 3000. For example, the RAM 3500 may be used as a working memory, an operation memory, a buffer memory, or the like, of the mobile electronic device 3000. The RAM 3500 may temporarily store data processed or to be processed by the main processor 3700.

The user interface 3600 may process interfacing between a user and the mobile electronic device 3000 according to the control of the processor 3700. For example, the user interface 3600 may include an input interface such as a keyboard, a keypad, a button, a touch panel, a touch screen, a touch ball, a touch pad, a camera, a microphone, a gyroscope sensor, and a vibration sensor. The user interface device 3600 may include an output interface such as a display device and a motor. For example, the display device may include a liquid crystal display (LCD), a light emitting diode (LED) display, an organic LED (OLED) display, or an active matrix OLED (AMOLED) display.

The main processor 3700 may control the overall operations of the mobile electronic device 3000. The image processor 3100, the wireless communication block 3200, the audio processor 3300, the NVM 3400, and the RAM 3500 may execute a user command provided via the user interface 3600 according to the control of the main processor 3700. In addition, the image processor 3100, the wireless communication block 3200, the audio processor 3300, NVM 3400, and the RAM 3500 may provide a service to the user via the user interface 3600 according to the control of the main processor 3700. The main processor 3700 may be implemented with a system-on-chip (SoC). For example, the main processor 3700 may include an application processor.

The PMIC 3800 may manage power used to operate the mobile electronic device 3000. For example, the PMIC 3800 may convert power supplied from a battery or an external power supply into any form or level. In addition, the PMIC 3800 may supply the converted power to components of the mobile electronic device 3000.

Each of the image processor 3100, the wireless communication block 3200, the audio processor 3300, the NVM 3400, the RAM 3500, the user interface 3600, the main processor 3700, and the PMIC 3800 may include a circuit implemented using a mask fabricated according to exemplary embodiments of the present inventive concept described with reference to FIGS. 2 to 16. A circuit included in each of the image processor 3100, the wireless communication block 3200, the audio processor 3300, the NVM 3400, the RAM 3500, the user interface 3600, the main processor 3700, and the PMIC 3800 may be implemented using a mask fabricated by optical proximity correction according to exemplary embodiments of the inventive concept. As described above, in optical proximity correction, according to an exemplary embodiment of the inventive concept, the same, or common, bias value may be assigned to segments having the same surrounding condition.

A circuit implemented using a mask, according to an exemplary embodiment of the inventive concept, may be mounted in various types of semiconductor packages. For example, a circuit implemented using a mask, according to an exemplary embodiment of the inventive concept, may be packaged by one or more of a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a metric quad flat pack (MQFP), a thin quad flat pack (TQFP), a small outline integrated circuit (SOIC), a shrink small outline package (SSOP), a thin small outline package (TSOP), a system in package (SIP), a multi chip package (MCP), a wafer-level fabricated package (WFP), and a wafer-level processed stack package (WSP).

The shape, structure, and size of each component illustrated in each diagram may be exaggerated or downsized for better understanding of the present inventive concept. An actually implemented configuration may have a physical shape different from a configuration of each diagram. The present inventive concept is not limited to a physical shape or size illustrated in each diagram.

The device configuration illustrated in each block diagram is provided to help understanding of the present inventive concept. Each block may include additional blocks that perform various functions. In addition, a plurality of blocks may form a larger block that contributes to the performance of a function. Accordingly, the present inventive concept is not limited to the components illustrated in each block diagram.

As described above, a plurality of segments may be classified into a plurality of groups such that segments having the same surrounding condition are included together in one of the groups. Thus, the same (or common) bias value may be assigned to the segments having the same surrounding condition. As a result, optical proximity correction may be performed more efficiently and uniformly. Moreover, a mask including precise image patterns may be fabricated based on a result of the optical proximity correction performed in accordance with an exemplary embodiment of the present inventive concept.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A mask fabricating method comprising:
   dividing an outline of a design layout into a plurality of segments;
   setting one or more comparison areas, each of the comparison areas being formed with respect to an evaluation point corresponding to each of the segments, the comparison areas being different from one another;
   for each of the segments, calculating an overlapping area between the design layout and each of the comparison areas;
   classifying the segments into a plurality of groups based on the calculated overlapping areas, wherein segments having a same overlapping area are included in a same group;
   calculating a bias value for each of the segments;
   obtaining a representative bias value for each of the groups;
   for each of the groups, assigning the representative bias value obtained for that group to each of its segments;
   updating the design layout based on the segments with their assigned representative bias values; and
   fabricating a mask based on the updated design layout.

2. The mask fabricating method of claim 1, wherein for each of the segments, the evaluation point corresponds to a middle point of each of the segments.

3. The mask fabricating method of claim 2, wherein a center of the comparison areas set at each of the segments corresponds to the middle point of its respective segment.

4. The mask fabricating method of claim 1, wherein the representative bias value of a respective group is an average of the bias values of the one or more segments included in that group.

5. The mask fabricating method of claim 1, further comprising:
   determining whether an error between an actual layout to be obtained based on the updated design layout and a target layout is within an allowable level; and
   when the error is not within the allowable level, re-performing steps of calculating the bias value, obtaining the representative bias value, assigning the representative bias value, and updating the design layout on the updated design layout.

6. The mask fabricating method as set forth in claim 5, wherein, when the error is within the allowable level, the mask is fabricated based on the updated design layout.

7. A mask fabricating method comprising:
   calculating bias values for some or all of a plurality of segments, the segments being obtained by dividing an outline of a design layout;
   updating the design layout by assigning the bias values to the segments; and
   fabricating a mask based on the updated design layout, wherein updating the design layout comprises:
      assigning a same bias value to one or more segments having a same surrounding condition, the surrounding condition of each segment being based on overlapping areas between the design layout and one or more comparison areas, each of the one or more comparison areas being formed with respect to an evaluation point corresponding to each of the segments.

8. The mask fabricating method of claim 7, wherein each of the comparison areas is disposed around a middle point of each corresponding segment,
   wherein the comparison areas do not overlap with each other, and
   wherein a comparison area formed at an evaluation point of a first segment has a same shape as a comparison area formed at an evaluation point of a second segment.

9. The mask fabricating method of claim 7, wherein calculating the bias values comprises:
   calculating a bias value for each of the segments, and
   wherein assigning the same bias value comprises:
   classifying the segments into a plurality of groups based on the overlapping areas, wherein one or more segments having the same surrounding condition are included in a same group;
   obtaining a representative bias value for each of the groups; and
   for each of the groups, assigning the representative bias value obtained for that group to each of its segments.

10. The mask fabricating method of claim 7,
   wherein calculating the bias values comprises:
      classifying the segments into a plurality of groups based on the overlapping areas, wherein one or more segments having the same surrounding condition are included in a same group;
      for each of the groups, selecting a representative segment from among one or more segments included in each of the groups; and
      calculating a bias value for each of the representative segments, and wherein assigning the same bias value comprises:
assigning the bias value of a respective representative segment to each segment included in a same group as the representative segment.

11. The mask fabricating method of claim 7, wherein the comparison areas comprise first to $N^{th}$ comparison areas, the first comparison area having a square shape, and each of the second to $N^{th}$ comparison areas have a square ring shape, wherein the square ring shape has a first ring width along a first direction, a second ring width along a second direction, a first distance from its corresponding evaluation point to an external outline along the first direction, and a second distance from its corresponding evaluation point to the external outline along the second direction, and wherein the N is an integer greater than or equal to 2.

12. The mask fabricating method of claim 11, wherein for each of the second to $N^{th}$ comparison areas, their first and second ring widths are determined or adjusted based on a resolution of a process.

13. The mask fabricating method of claim 11, wherein the first distance is w times the first ring width and the second distance is w times the second ring width, for each of the second to $N^{th}$ comparison areas, and wherein the w is an integer between 2 and N.

14. The mask fabricating method of claim 11, wherein the square ring shape is based on a ratio of the first distance to the second distance.

15. The mask fabricating method of claim 7, wherein a number of the comparison areas is determined or adjusted based on a distance where a bias value to be assigned to each segment is affected on the design layout.

16. A mask fabricating method comprising:
receiving a first circuit pattern and a second circuit pattern;
dividing an outline of the first circuit pattern into a first segment and a second segment;
dividing an outline of the second circuit pattern into a third segment and a fourth segment;
assigning a first reference point to the first segment, a second reference point to the second segment, a third reference point to the third segment, and a fourth reference point to the fourth segment;
disposing a first comparison area on the first reference point, a second comparison area on the second reference point, a third comparison area on the third reference point and a fourth comparison area on the fourth reference point, wherein the first to fourth comparison areas have a same shape;
determining a first overlapping area between the first comparison area and the first and second circuit patterns, a second overlapping area between the second comparison area and the first and second circuit patterns, a third overlapping area between the third comparison area and the first and second circuit patterns, and a fourth overlapping area between the fourth comparison area and the first and second circuit patterns;
assigning the first and second segments into a first group when the first and second overlapping areas are equal to each other;
assigning the third segment into a second group when the third overlapping area is different from the first and second overlapping areas;
determining a first bias value for the first segment, a second bias value for the second segment, a third bias value for the third segment and a fourth bias value for the fourth segment;
assigning a first representative bias value to each of the first and second segments, wherein the first representative bias value is obtained based on the first bias value and/or the second bias value;
changing the outline of the first circuit pattern based on the first representative bias value; and
fabricating a mask based on the changed outline.

17. The mask fabricating method of claim 16, wherein when the fourth overlapping area is different from the first, second and third overlapping areas, the fourth segment is assigned into a third group.

18. The mask fabricating method of claim 16, wherein the first representative bias value is equal to the first bias value, the second bias value, or an average of the first and second bias values.

19. The mask fabricating method of claim 16, wherein when the fourth overlapping area is equal to the first and second overlapping areas, the fourth segment is assigned into the first group, and the first representative value is obtained based on at least one of the first, second and/or fourth bias values and assigned to each of the first, second and fourth segments.

20. The mask fabricating method of claim 19, wherein the first representative value is equal to the first bias value, the second bias value, the fourth bias value, or an average of the first, second and fourth bias values.

* * * * *